United States Patent
Ricke et al.

(10) Patent No.: US 11,293,360 B2
(45) Date of Patent: Apr. 5, 2022

(54) SMART DRIVELINE DISCONNECT

(71) Applicant: TEAM Industries, Inc., Bagley, MN (US)

(72) Inventors: Micah Ryan Ricke, Fosston, MN (US); Brandon P. Lenk, Shevlin, MN (US); John Edward Hamrin, Bemidji, MN (US); Matthew Douglas Cann, Bemidji, MN (US); Gregory Lee Maki, Solway, MN (US); Ronald Joseph Wendt, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 0 days.

(21) Appl. No.: 16/912,993

(22) Filed: Jun. 26, 2020

(65) Prior Publication Data

US 2020/0408162 A1 Dec. 31, 2020

Related U.S. Application Data

(60) Provisional application No. 62/866,816, filed on Jun. 26, 2019.

(51) Int. Cl.
*F02D 41/02* (2006.01)
*B60W 30/188* (2012.01)
(Continued)

(52) U.S. Cl.
CPC .......... *F02D 41/022* (2013.01); *B60W 10/02* (2013.01); *B60W 10/06* (2013.01);
(Continued)

(58) Field of Classification Search
CPC .............. F02D 41/022; F02D 41/0225; F02D 2200/0404; B60W 10/02; B60W 10/06; B60W 30/188; B60W 50/14
See application file for complete search history.

(56) References Cited

U.S. PATENT DOCUMENTS 6,769,526 B2 * 8/2004 Iida ................ B60W 30/186
192/82 T
7,077,783 B2 * 7/2006 Senger ............ F16D 48/066
192/103 F
(Continued)

FOREIGN PATENT DOCUMENTS

DE 102012108299 A1 * 3/2013 ........... F02D 41/022
DE 102014210239 A1 * 12/2014 ............. F02D 41/08
(Continued)

OTHER PUBLICATIONS

DE102014210239 machine translation filed Jul. 26, 2021 (Year: 2021).*

(Continued)

*Primary Examiner* — Tisha D Lewis
(74) *Attorney, Agent, or Firm* — Fogg & Powers LLC

(57) ABSTRACT

A smart driveline disconnect assembly having a torque coupling assembly, an actuator, at least one sensor and a controller is provided. The torque coupling assembly is configured to selectively couple torque between a transmission and a final drive assembly. The actuator is configured to activate the torque coupling assembly. The at least one sensor is used to generate sensor information. The controller is configured to control the actuator based at least in part on the sensor information. The controller is further configured to determine at least a thermal energy level associated with the torque coupling assembly based on the sensor information and at least in part control the actuator based on the determined estimated thermal energy level.

20 Claims, 10 Drawing Sheets

(51) Int. Cl.
  *B60W 10/00* (2006.01)
  *B60W 50/14* (2020.01)
  *B60W 10/02* (2006.01)
  *B60W 10/06* (2006.01)

(52) U.S. Cl.
  CPC .......... *B60W 30/188* (2013.01); *B60W 50/14* (2013.01); *F02D 41/0225* (2013.01); *F02D 2200/0404* (2013.01)

(56) References Cited

U.S. PATENT DOCUMENTS

| | | |
|---|---|---|
| 7,497,297 B2 | 3/2009 | Watson et al. |
| 7,810,601 B2 | 10/2010 | Hamrin et al. |
| 8,771,128 B2 | 7/2014 | Ekonen et al. |
| 9,074,672 B2 | 7/2015 | Downs et al. |
| 9,546,722 B2 | 1/2017 | Fox |
| 9,718,355 B2 | 8/2017 | Osborn et al. |
| 2008/0234106 A1* | 9/2008 | Maguire ............... F02D 41/022 477/169 |
| 2014/0100077 A1 | 4/2014 | Ekonen et al. |

FOREIGN PATENT DOCUMENTS

| | | |
|---|---|---|
| GB | 2488410 A | 8/2012 |
| WO | 2013173154 A1 | 11/2013 |

OTHER PUBLICATIONS

DE102012108299 machine translation filed Jul. 26, 2021 (Year: 2021).*

Lee, "All-wheel drive disconnect clutch system", SYMPOSIUM 2010, pp. 361 through 365, Schaeffler SYMPOSIUM.

* cited by examiner

SMART DRIVELINE DISCONNECT

CROSS-REFERENCE TO RELATED APPLICATIONS

This application claims priority to U.S. Provisional Application Ser. No. 62/866,816, same title herewith, filed on Jun. 26, 2019, which is incorporated in its entirety herein by reference

BACKGROUND

In a typical four wheel drive or all-wheel drive design, for a motor vehicle, power from a transmission is coupled to front wheels of the vehicle through a differential. The differential is typically a bevel gear or spur gear variety that is operationally coupled through one or more gear sets to right and left front wheels. Since the wheels are coupled to the drivetrain through one or more gear sets, a means of disconnecting the front final drive is desired when an operator only wants the rear wheels to power vehicle. Operating in two wheel drive, when four wheel drive is not needed, provides advantages such as lower steering effort, better vehicle handling, and better fuel economy. Further, a disconnected front final drive also provides the advantage of not allowing vehicle loads/road loads to be back driven by the assist wheels into the main transmission.

SUMMARY

The following summary is made by way of example and not by way of limitation. It is merely provided to aid the reader in understanding some of the aspects of the subject matter described. A computer controlled driveline torque coupling assembly is provided in embodiments.

In one embodiment, a smart driveline disconnect assembly having a torque coupling assembly, an actuator, at least one sensor and a controller is provided. The torque coupling assembly is configured to selectively couple torque between a transmission and a final drive assembly. The actuator is configured to activate the torque coupling assembly. The at least one sensor is used to generate sensor information. The controller is configured to control the actuator based at least in part on the sensor information. The controller is further configured to determine at least a thermal energy level associated with the torque coupling assembly based on the sensor information and at least in part control the actuator based on the determined estimated thermal energy level.

In another embodiment, a smart driveline disconnect assembly that includes a torque coupling assembly, an actuator, at least one sensor and a controller is provided. The torque coupling assembly is configured to selectively couple torque between a transmission and a final drive assembly based on an external activation. The torque coupling assembly is further internally configured to adjust an amount torque coupled between the transmission and the final driveline assembly to prevent damage from external forces exceeding a dirveline torque capacity when the torque coupling assembly is engaged. The actuator is configured to externally activate the torque coupling assembly. The at least one sensor is used to generate sensor information. The controller is configured to control the actuator based at least in part on the sensor information.

In yet another embodiment a vehicle with a smart driveline disconnect assembly is provided. The vehicle includes a motor to generate engine torque, a transmission operationally coupled to the motor, at least one drive wheel and at least one assist wheel. The at least one drive wheel is operationally coupled to the transmission. The at least one assist wheel is operationally coupled to a final drive assembly. The final drive assembly is operationally coupled to the transmission. The torque coupling assembly is operationally coupled between the final drive assembly and the transmission. The controller is configured to control the actuator based at least in part on sensor information. The controller is further configured to determine at least an estimated thermal energy level associated with the torque coupling assembly based on the sensor information and at least in part control the actuator based on the determined estimated thermal energy.

In still another embodiment, a method of operating a torque coupling assembly of a vehicle is provided. The method includes generating sensor information from at least one sensor; estimating a current thermal energy level of the torque coupling assembly based at least in part on the generated sensor information; and controlling at least one of torque transfer of the torque coupling assembly and an operational parameter of an engine based on the estimated thermal energy level.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

Figure 1:
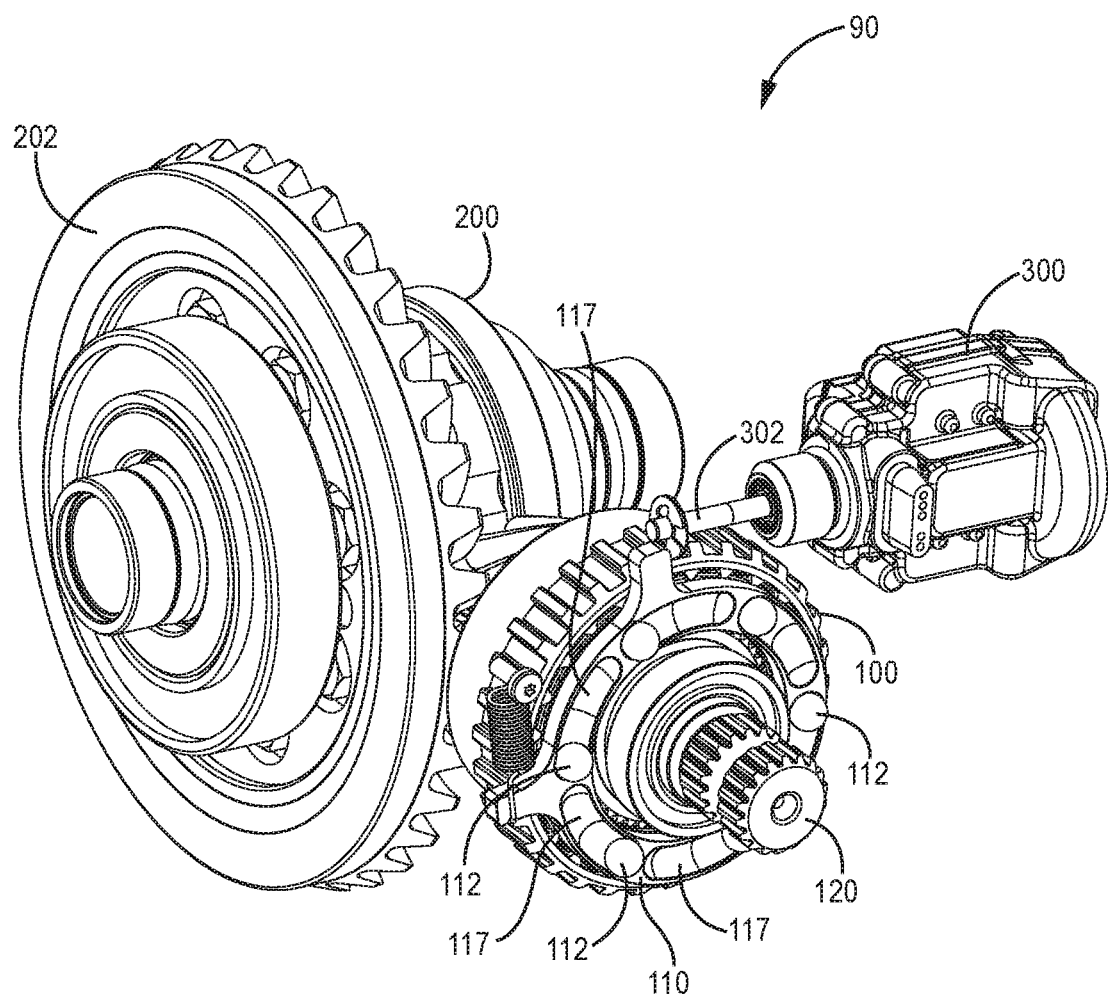
FIG. 1 illustrates an isometric view of a front final drive assembly with a disconnect assembly according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a computer controlled (herein referred to as "smart") driveline disconnect assembly that, in embodiments, selectively couples and disconnects the driveline disconnect assembly as needed. Further in one example embodiment, the driveline disconnect assembly only couples an assist final drive to the main transmission when additional torque is required to propel the vehicle. The smart driveline disconnect assembly may prevent damaging external loads from being transmitted through the driveline. Unlike traditional coupling devices that are user selected to be coupled or decoupled, embodiments have the ability to be controlled by a logic algorithm and only couple the driveline when needed. The amount of torque transferred to the assist final drive may be limited through this same algorithm, and or design, to prevent damage to the driveline.

Embodiments may implement a friction clutch pack, as discussed below, to transmit torque from a final drive input shaft to a pinon gear and ultimately through a differential to the front wheels. This clutch pack is compressed when a difference in speed, exceeding a predetermined threshold, is noted between the rear wheels and the front wheels of the vehicle creating an "on demand" coupling in an embodiment. An additional mode, in an embodiment, allows the user to select to couple the driveline and maintain this operating condition until the user selects to a decoupled state. The amount of axial force applied to the friction clutch pack determines how much torque it can transmit. This axial force can be designed to transmit full vehicle/engine power but allow the clutch pack to slip from excessive external loads that may otherwise damage the driveline.

Further, self-protection modes may be implemented into the algorithm to "open" or "disconnect" the clutch if the thermal energy produced by the slipping clutch exceeds a threshold at which damage would occur. Rather than opening the clutch, another means of damage prevention may include communication with the vehicle's engine control units (ECU's) to limit engine torque during a slip event to reduce the thermal energy produced in the clutch. Or it could be succession of limiting the engine torque and then opening the clutch if too much energy is still present. The mechanical activation of the clutch pack may also be designed in embodiments in such a way as to maintain torque under load without an external actuation force applied. A torque reversal would be needed in the driveline to then release the device in this instance. In one embodiment, an electronic switch in the cockpit allows the operator to select between various modes. These modes may include, but are not limited to, disconnected, connected and smart connect.

In the disconnect mode, that may also be commonly referred to as 2WD (two wheel drive), the operator selects a disconnect operation move in which the friction clutch pack is not compressed and allows free relative rotation between the assist wheels and the drive wheels of the vehicle. When selected, a signal is sent to the actuator to decouple the clutch pack to a free state. It may be desired to default to the disconnected state when power is not present. This can be accomplished in embodiments through proper design of the actuation mechanism.

In the connected mode, that may also be commonly referred to as 4WD (four wheel drive) or AWD (all wheel drive), an operator selects a connect operation mode in which a signal is sent to the actuator to compress the clutch pack with a predetermined force and maintains this condition. It may be desired to default to the connected state when power is not present. This can be accomplished through proper design of the actuation mechanism.

In the smart connect mode, that may also be commonly referred to as "on demand" or "automatic" 4WD/AWD, an operator selects a smart operation mode in which a controller continuously compares the speed of the drive wheels to the speed of the assist wheels. These speeds are commonly determined using sensors placed in a variety of locations in the driveline and can be calculated to respective wheel speeds based on gear ratios. Should a greater speed, above a defined threshold value, be recognized at the drive wheels than that at the assist wheels, a signal is sent to the actuator to couple the driveline. The threshold value above which the driveline couples can be tunable to include variables including, but not limited to: type of vehicle, gear range, ground speed, brake signal, operating selected operating modes, etc. This condition is held for a predetermined time constant, at which time the actuator is sent a signal to decouple the driveline. If sufficient traction is not present, and the drive wheel speed again exceeds the assist wheel speed threshold, the above process will be repeated. This decoupling method can be further refined to include an algorithm which incrementally reduces the actuator force at a predefined decay rate, while continually monitoring for drive wheel slip above the defined delta threshold. Should such slip be present, the actuator then incrementally increases actuator force until the threshold is no longer present and the process repeats itself. The rate of decay and force application are tunable, in this instance, as well as any amount of over clamp/over force desired in the system.

Additional input monitoring may be desired to either allow, or disallow, the smart connect mode to engage, or disengage. These may include, but are not limited to: brake signal, gear selection sensor, ground speed sensor, inclination sensor, suspension travel sensor, etc. Additional modes of operationally coupling the left and right drive wheels and left and right assist wheels may also be incorporated with the above listed modes depending on the type of differential used in each location.

Figure 2:
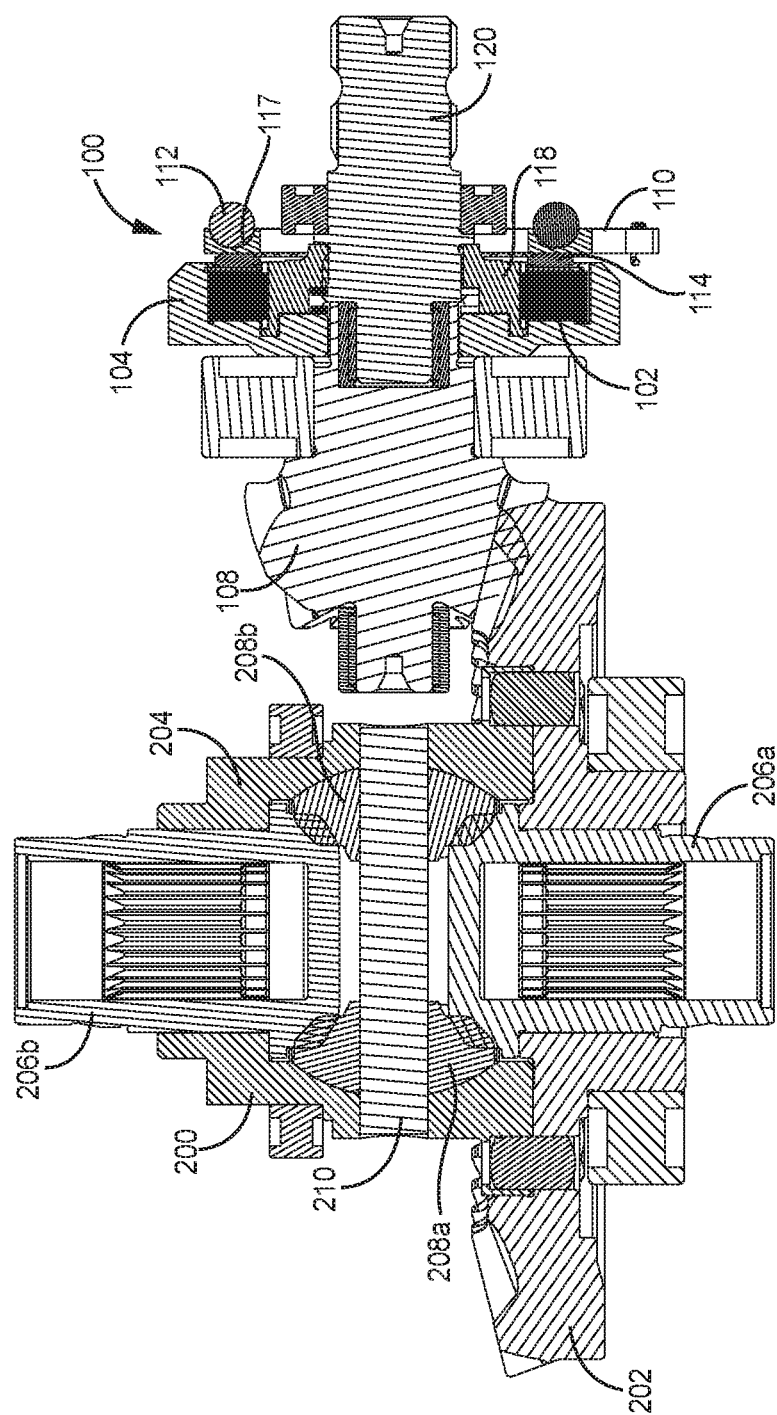
FIG. 2 illustrates a cross-sectional top view of a portion of the front final drive assembly of FIG. 1 according to one exemplary embodiment.
Figure 3:
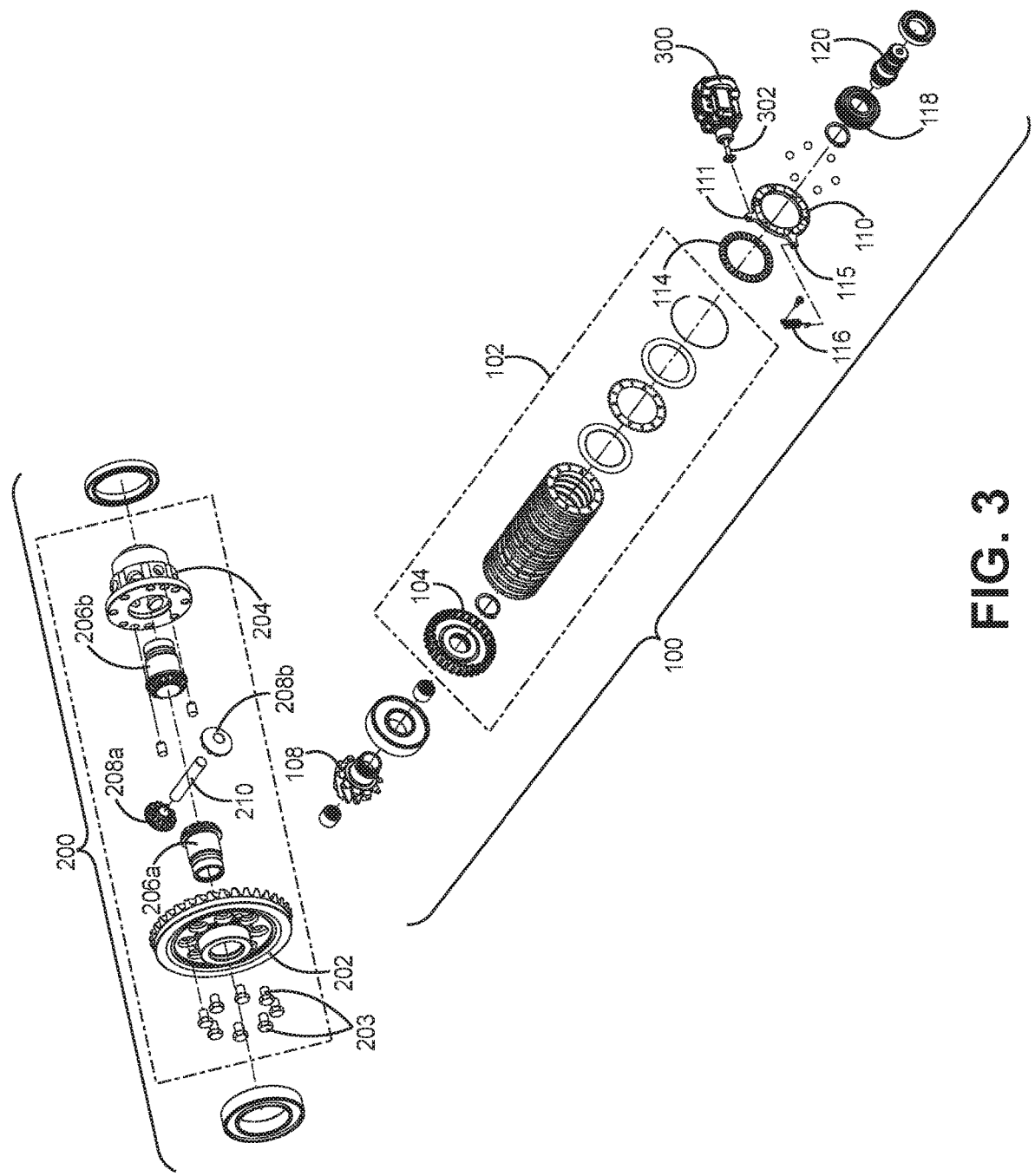
FIG. 3 illustrates an un-assembled isometric view of the front final drive assembly with a disconnect assembly of FIG. 1.

FIGS. 1 through 3 show one possible configuration of a final drive assembly 90 in which a portion of a smart driveline disconnect assembly is operationally coupled. The final drive assembly 90 in this exampled includes a differential 200. The final drive assembly may be a front final drive assembly 90 as described below or it may be a rear final drive assembly 90 in another embodiment. Operationally coupled to the final drive assembly 90 is a disconnect assembly 100 (or torque coupling assembly 100) that is located on the input shaft 120 of a final drive of a vehicle illustrated in the block diagram of FIG. 4. For illustration purposes, cases or housings, used to contain these components have been removed in FIGS. 1-3. The general term "operationally coupled," used herein refers to a connection that couples torque between components either directly or indirectly.

Figure 4:
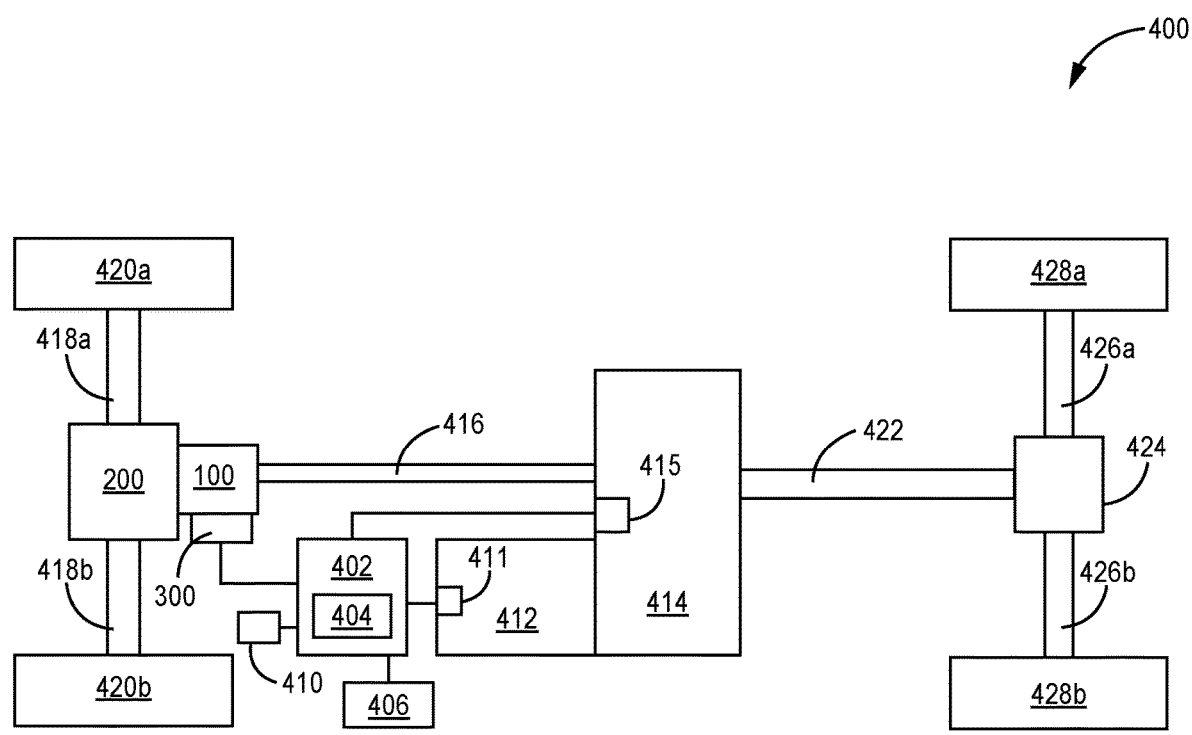
FIG. 4 illustrates a block diagram of a vehicle including a smart disconnect assembly according to one exemplary embodiment.

The smart driveline disconnect assembly includes the torque coupling assembly 100, an actuator 300 and a controller 402 (illustrated in FIG. 4). The actuator 300 includes an actuator rod 302 that is configured to engage a ball ring 110 of the disconnect assembly 100 to selectively activate the torque coupling assembly 100 to operationally couple torque between the input shaft 120 and the final drive assembly which is a front differential 200 in this example embodiment.

The differential 200 in this example includes a ring gear 202 that is coupled to a carrier 204 via fasteners 203. Within the carrier 204 is housed first and second side gears 206a and 206b which couple torque to the respective front wheels of the vehicle. Further received within the housing 204 is first pinion gear 208a and as second pinion gear 208b. The first pinion gear 208a and the second pinion gear 208b are both rotationally mounted on opposite ends of a cross-pin 210. The first pinion gear 208a and as second pinion gear 208b are positioned to engage the first and second side gears 206a and 206b. Although the example differential 200 is shown has including two pinion gears 208a and 208b, other types of differentials may be used including differentials with more than two pinion gears.

The torque coupling assembly 100 in this example includes a clutch pack 102, the input shaft 120, a clutch outer basket 104, a clutch inner basket 118, a ball ring 110, balls 112, a thrust bearing 114 and a final drive pinion gear 108. The input shaft 120 is operationally coupled to a front prop shaft or drive shaft to couple torque between a transmission and the torque coupling assembly 100. The clutch inner basket 118 is operationally coupled to the input shaft 120. The clutch pack 102 includes a plurality of alternating clutch plates. A first set of clutch plates are coupled to the clutch outer basket 104 and a second set of clutch plates are coupled to the clutch inner basket 118. In another embodiment, the first set of clutch plates may be coupled to the clutch inner basket 118 and the second set of clutch plates may be coupled to the clutch outer basket 104.

The thrust bearing 114 is positioned to engage the clutch pack 102. The ball ring 110 further is positioned to engage the thrust bearing 114. The ball ring 110 includes a manipulation tab 111 that, in this example embodiment, extends radially outward from an outer parameter of the ball ring 110. Further in this example embodiment, an end of the actuation rod 302 of the actuator 300 operationally engages the manipulation tab 111 to selectively rotate the ball ring 110 about the input shaft 120. The ball ring 110, in this example, includes one or more ball ramp channels 117 (best illustrated in FIG. 1) in which the balls 112 are received. The balls 112 are held in the respective ball ramp channels 117 via static engaging surface such as an inner surface of a case or housing (not shown) of the torque coupling assembly 100. As ball ring 100 is rotated, the balls 112 engaging the ramp surfaces of the ball ramp channels 117 pushing the ball ring 110 into the thrust bearing 114 which in turn pushes the plates of the clutch pack 102 together to couple torque between the clutch inner basket 118 and the clutch outer basket 104.

The ball ring 110 in this embodiment further includes a bias tab 115 that extends radially outward from the outer parameter of the ball ring 110 a select distance from the manipulation tab 111. A biasing member 116 is positioned between a static member, such as a case or housing of the disconnect, and the bias tab 115 to exert a bias force on the ball ring 110 to be in a desired rotational position in the absence of a force provided by the actuator 300.

The clutch outer basket 104, in this example is operationally coupled to the final drive pinion gear 108. Final drive pinion gear 108 in turn engages the ring gear 202 of the differential 200 to couple torque between the torque coupling assembly 100 and the front differential 200.

As discussed above, when actuator 300 is activated, the actuator 300 rotates the ball ramp 110 which in turn applies an axial force on the friction clutch pack 102. The number of reaction and friction plates used in the clutch pack 102 is dependent on the torque that it must carry. Once compressed, the clutch pack 102 operationally couples the input shaft 120 to the pinion gear 108. Torque can now be transmitted from the front drive shaft (or front prop shaft) of a vehicle 400, through the final drive pinion gear 108, into the differential 200 and out to the front wheels.

Referring to FIG. 4 a block diagram of a vehicle 400 incorporating a smart driveline disconnect of an example embodiment is illustrated. Vehicle 400 is illustrated as including a motor 412. The motor is operationally coupled to a transmission 414. A back prop shaft 422 couples torque between the transmission and a rear differential 424. In another embodiment, a transaxle may be used instead of the transmission/rear differential configuration. The rear differential 424 in the embodiment is operationally coupled to rear wheels 428a and 428b via rear half shafts 426a and 426b.

The torque coupling assembly 100 is operationally coupled to the transmission via front prop shaft 416. As discussed above, the torque coupling assembly 100 selectively couples torque between the front prop shaft 416 and the front final drive assembly which may be a front differential 200. Further, front wheels 420a and 420b are operationally coupled to differential 200 via half shafts 418a and 418b. Each front wheel 420a and 420b may be referred to as an assist wheel because it is selectively coupled to the transmission 414 to transfer torque when needed and each rear wheel 428a and 428b may be referred to as drive wheels because it is operationally coupled to the transmission 414. In other embodiments, one or more of the front wheels are one or more drive wheels while one or more rear wheels are one or more assist wheels. Hence different vehicle configurations are contemplated.

Also illustrated in FIG. 4 is a controller 402 that is in communication with actuator 300 to selectively activate the actuator 300 to activate the torque coupling assembly 100. The controller 402 includes a memory 404 to store operating instructions, including algorithms discussed above, used by the controller 402 in activating the torque coupling assembly 100. The controller 402 may be in communication with one or more sensors, generally designated as sensor 410. Examples of sensors 410 include, but are not limited to, brake sensors, gear selection sensors, throttle position sensor, ground speed sensors, inclination sensors, temperature sensors, suspension travel sensors, etc. The sensors may further include a motor sensor 411 that sense engine RPMs or a transmission sensor 415 that senses speed of the vehicle and relative rotation rates between the front wheels 420a and 420b and rear wheels 428a 428b. Further, in an embodiment, an operator selection member 406 is in communication with the controller 402. The operator selection member 406, such a switch, allows the operator to select between operating modes such as a disconnect mode, a connect mode and a smart connect mode as discussed above.

In general, the controller 402 may include any one or more of a processor, microprocessor, a digital signal processor (DSP), an application specific integrated circuit (ASIC), a field program gate array (FPGA), or equivalent discrete or integrated logic circuitry. In some example embodiments, controller 402 may include multiple components, such as any combination of one or more microprocessors, one or more controllers, one or more DSPs, one or more ASICs, one or more FPGAs, as well as other discrete or integrated logic circuitry. The functions attributed to the controller 402 herein may be embodied as software, firmware, hardware or any combination thereof. The controller 402 may be part of a system controller, such as an engine control unit or transmission control unit, or a component controller. The memory may include computer-readable operating instructions that, when executed by the controller provides functions of the torque coupling assembly 100. The computer readable instructions may be encoded within the memory 404. Memory 404 may comprise computer readable storage media including any volatile, nonvolatile, magnetic, optical, or electrical media, such as, but not limited to, a random access memory (RAM), read-only memory (ROM), non-volatile RAM (NVRAM), electrically-erasable programmable ROM (EEPROM), flash memory, or any other storage medium.

Embodiments may also provide a smart driveline disconnect system that has the ability to use the disconnect 100 to actively control coupling torque via the controller/sensor configuration discussed above and/or by passively limiting the torque through a mechanical system so that only a select amount of compression on the clutch pack is provided (or the size of the clutch pack is selected to only achieve a certain capacity) to prevent driveline damage from external forces exceeding engine torque capacity.

Figure 5:
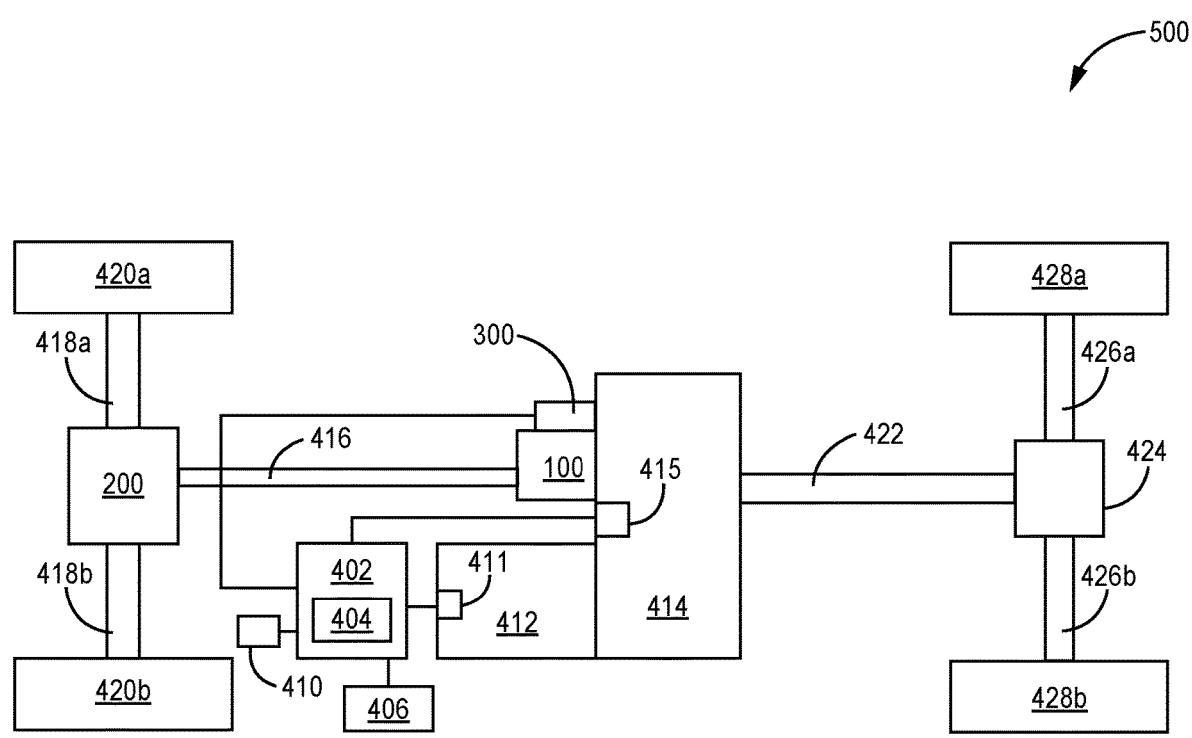
FIG. 5 illustrates a block diagram of another vehicle including a smart disconnect assembly according to one exemplary embodiment.

The location of the torque coupling assembly 100 can also be placed inside the transmission, after the transmission, or as part of the final gear reduction to the final output. It may also be incorporated as part of the assist drive shaft of the vehicle or as standalone assembly at either end of the drive shaft. For example, referring to FIG. 5, a vehicle 500 including an embodiment where the torque coupling assembly is positioned between the transmission 415 and the front prop shaft 416 is illustrated.

Other types of torque coupling assemblies (or disconnect assemblies), instead of a friction clutch pack 102, may be used in other embodiments. These torque coupling assemblies include, but are not limited to, engagement dogs, spline collar engagement, magnetic clutch, etc. In embodiments with thermal protection, engagement dogs and spline collar engagement systems would include a secondary system to provide slippage.

As discussed above, embodiments selectively control the disconnect based on operator selection and operating conditions of the vehicle. One of the operating conditions is the temperature of the torque coupling assembly 100. Control of the disconnect may at least in part be based on a temperature of the disconnect in an embodiment. In some embodiments, sensor information from the sensors 410 is used to estimate the temperature of the torque coupling assembly 100. For example, the sensor information may include two speed signals that allow a speed delta across pack calculation. With only using speed information, a slipping between clutch plates of the clutch pack 102 in the disconnect 100 can be determined as well as how long the slipping has occurred. Through direct or indirect knowledge of the force of actuator 300, a simple time at level type calculation may be used in this embodiment to estimate the thermal energy of the disconnect 100. Further in an embodiment, an oil bath temperature signal from one or more thermal sensors 410 may be used to further refine thermal energy calculations. Adding temperature allows the calculation to scale a threshold for taking action. For example, if the torque coupling assembly 100 is cold when the speed delta is observed, it may be able to slip for 15 seconds, but if the torque coupling assembly 100 is already at an elevated temperature, the 15 second threshold could be scaled down to 5 seconds. In addition, a throttle position signal from a throttle positioning sensor 410 may also be used in an embodiment. In this example, if a speed delta vs time threshold is met, and the controller 402 sees 100 percent throttle is applied, the controller 102 may scale the threshold to proactively keep out of the thermal danger zone.

A potential challenge with temperature sensor data is that it isn't directly measuring the clutch pack 102 temperature so depending on the application (how much oil, how fast heat transfers to the oil), there may be some lag time. For example, the clutch pack 102 may be hot from an event that just occurred, but the bulk oil temp doesn't yet reflect the temperature of the clutch pack 102. This should be taken into consideration when determining if a thermal energy level has reached a threshold. Further adjusting a threshold depending on a measured temperature may be used in some embodiments.

Further embodiments may use actuator force/position/ clutch pressure signals from associated sensors 410 in calculating when to disconnect the disconnector 100. In addition, gear position may also be used to help determine the rate at which the energy will increase (similar to throttle position information described above).

In another embodiment, where the thermal energy is monitored, an alert is generated to the operator to indicate a potential danger during an increasing danger period with the disconnect 100 automatically disconnected after energy surpasses a threshold. This embodiment does not adjust an output of the motor 412 but only controls the disconnect 100. This embodiment may be used in applications where the vehicle lacks an engine control unit (ECU) that allows precise control of the engine, or if the time constant to control the engine were too slow.

As discussed above, some embodiments offer torque control of the torque coupling assembly 100. One benefit to having torque control on the torque coupling assembly 100 vs only an on/off system is that the differential 100 can be gradually scaled back in torque transfer so the vehicle dynamics are not abruptly affected. As the torque is throttled back, the slip rate increases, so embodiments need enough thermal storage capacity within the disconnect to allow a gradual decay. Some applications do not allow for the added space needed for the added thermal capacity or the cost to have an oversized clutch pack 102. If this is the situation, a basic on/off torque coupling assembly 100 may be used. Further in one embodiment with a basic on/off torque coupling assembly, a decay of torque transfer is accomplished before completely disengaging the clutch.

FIGS. 6 through 10 illustrate various disconnect flow diagrams 600, 700, 800, 900 and 1000. The flow diagrams are provided as a series of sequential blocks implemented by the controller 402 executing instructions stored in the memory 404 based on sensor data from one or more of the sensors 410, 411 and 415 described above. The sequence of the blocks may be different in other embodiments or may run in parallel. Hence, embodiments are not limited to the sequential sequence of blocks as set out in FIGS. 6 through 10.

Figure 6:
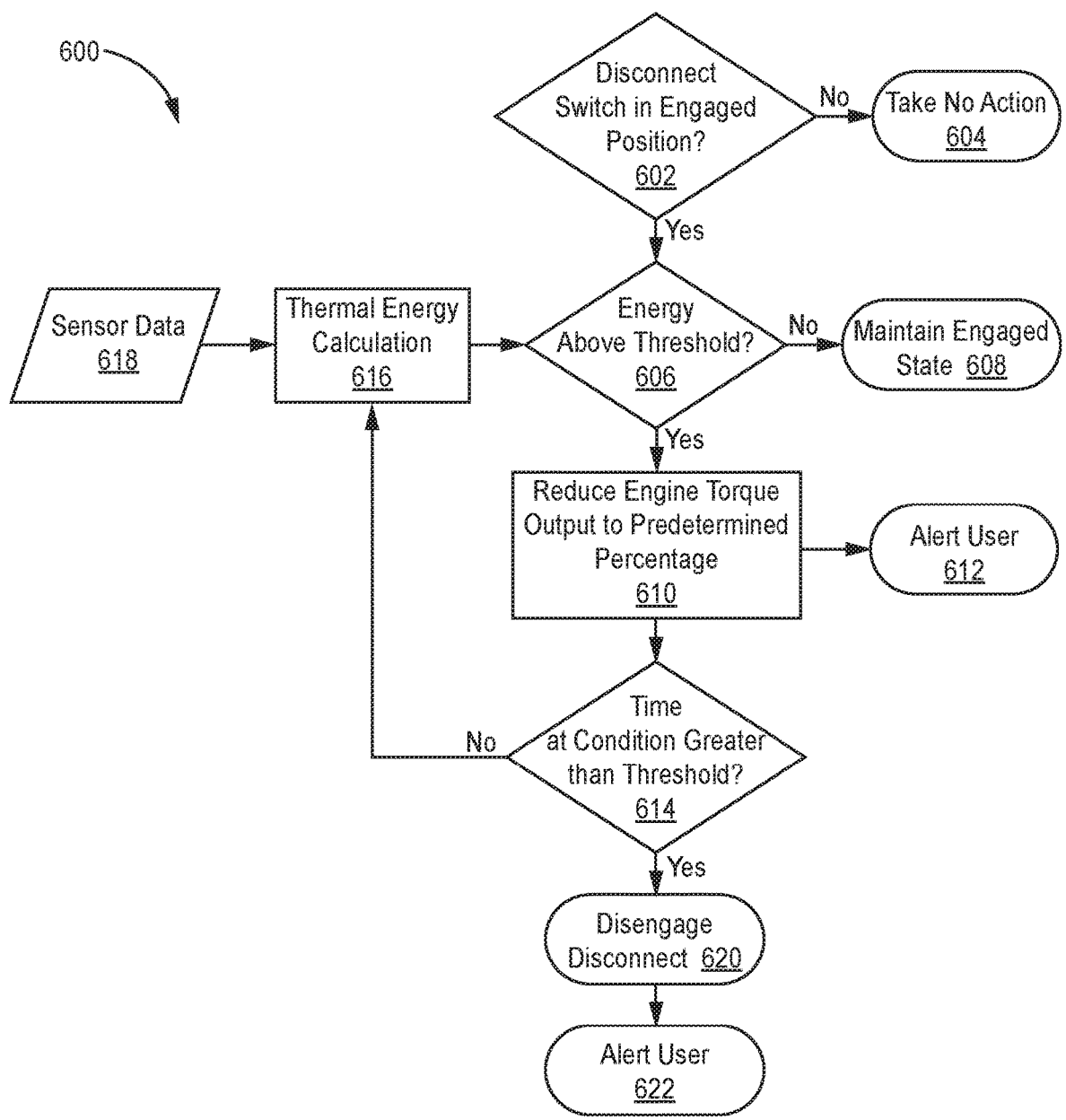
FIG. 6 illustrates a thermal disconnect protection flow diagram of one exemplary embodiment.
Figure 7:
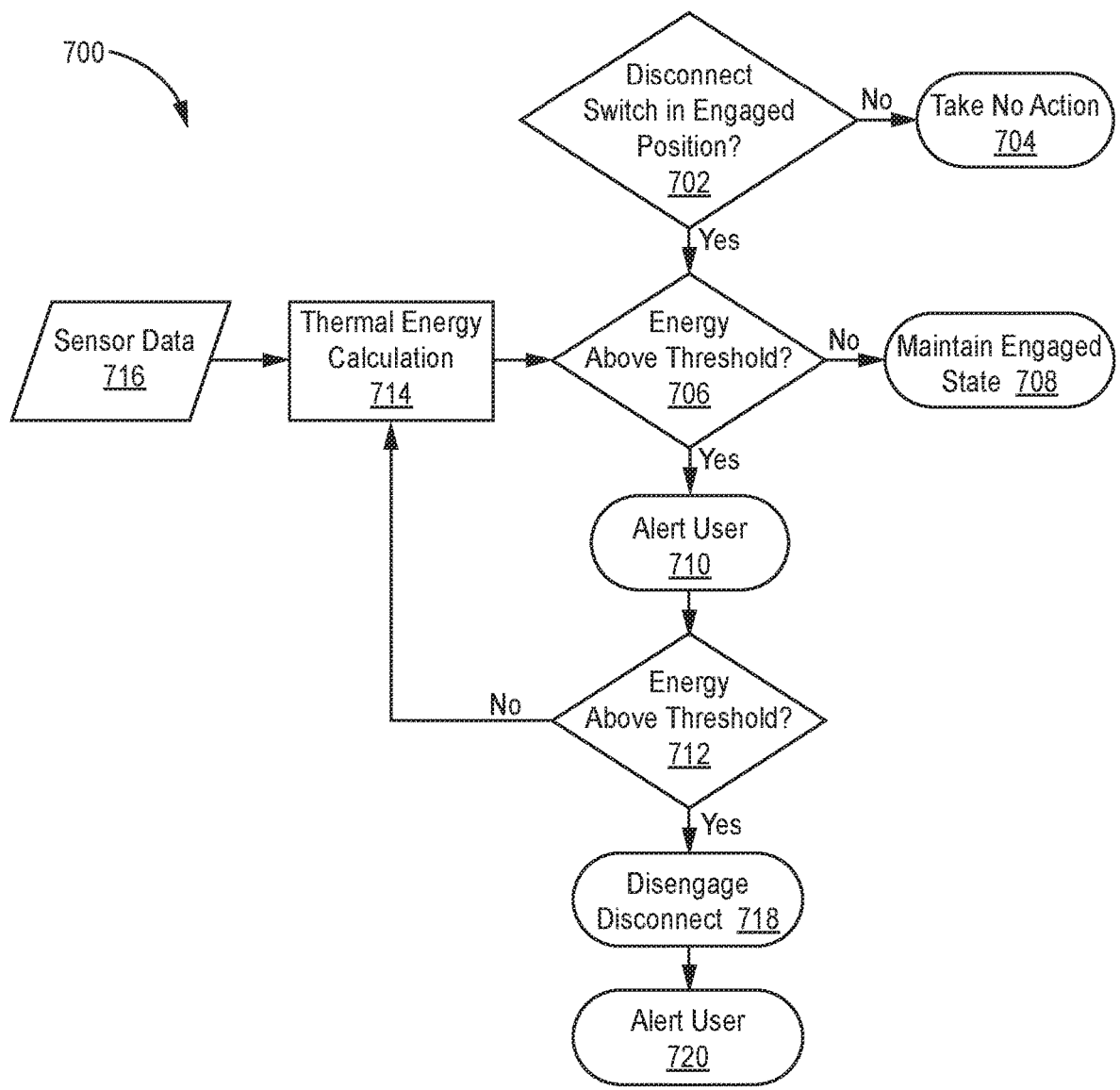
FIG. 7 illustrates another thermal disconnect protection flow diagram of another exemplary embodiment.

FIGS. 6 and 7 illustrate flow diagrams of systems that protect drivetrain components by monitoring thermal energy in the torque coupling assembly 100. FIG. 6 illustrates a first thermal disconnect protection flow diagram 600 of one example embodiment that has the capability of controlling engine torque output. In particular, disconnect flow diagram 600 illustrates an example of how the controller 402 of a smart driveline disconnect assembly may control a torque coupling assembly 100 (or disconnect assembly) to control thermal distress where engine intervention is possible. In this example, engine torque is first reduced to avoid a disengagement of the torque coupling assembly 100. Reducing the engine torque from the motor 412 in an example embodiment is done to a present percentage which may be accomplished by a variable decay rate. This is controlled by the controller 402 based on the instructions stored in the memory 404. The rate may vary based on sensor data, from sensors 410, 411 and 415 and energy calculations (i.e. the rate may be more aggressive when the rate of change of the energy is greater and less aggressive when the rate of change is less aggressive). In another example, a step input to a predetermined percentage is used in an infinite decay rate.

In this example of the thermal disconnect protection flow diagram 600, the process starts at block (602) where it is determined, while an associate vehicle is running, if a disconnect switch 406 is in an engaged position. If the disconnect switch 406 is not in the engaged position at block (602), no action is taken at block (604). In an embodiment, the process would continue at block (602) monitoring if the disconnect switch 406 has been activated while the vehicle is running.

If it is determined at block (602) that the disconnect switch 406 of the operator selection member 406 is in the engaged position/connected position/smart connected position, it is then determined if a thermal energy level (provided by block 616) is above a thermal threshold at block (606). If the thermal energy level is not above the threshold at block (606), the torque coupling assembly 100 remains in the engaged position at block (608). The process continues to monitor the energy threshold at block (606). If it is determined at block (606) the thermal energy level is above the thermal threshold, an engine torque output is reduced by a predetermined percentage at block (610) and an alert is provided to the user at block (612).

It is then determined at block (614) if a time when the thermal energy level is above the threshold is greater than a time threshold. That is, this process monitors how long the thermal energy level is above the threshold. If the time has not reached the time threshold at block (614), sensor data from block (618) is provided to a thermal energy calculation at block (616) to provide the current thermal energy level used at block (606) to determine if the then current thermal energy level is above the thermal threshold. If the current thermal energy level is not above the thermal threshold at block (606), the process continues at block (608) and the torque coupling assembly 100 remains engaged. In one embodiment, at block (608), the torque coupling assembly 100 is maintained in an engaged position with full engine torque allowed. The process with then continue to monitor the thermal energy level at block (606).

If it is determined at block (614) time has reached or is greater than the time threshold, the torque coupling assembly 100 is disengaged at block (620) and an alarm is sent to the operator at block (622) to inform the operator the vehicle is no longer in four wheel drive/all wheel drive. In an embodiment, the operator will be allowed to engage the torque coupling assembly 100 after a period of time or once the thermal energy is below a current threshold at block (606).

A second thermal disconnect protection flow diagram 700 example is illustrated in FIG. 7. In this example, the mitigation is addressed by only disengaging the torque coupling assembly 100. This application may be applied in situation where control of the engine is not practical or available. In this example, the process starts at block (702) where it is determined if a disconnect switch 406 is in an engaged position/connected position/smart connected position while the vehicle is running. If the disconnect switch 406 is not in the engaged position at block (702), no action is taken at block (704).

If it is determined at block (702) that the disconnect switch 406 is in the engaged position, it is then determined if a thermal energy level (provided by block (716)), is approaching a thermal threshold at block (706). If the thermal energy level is not approaching a thermal threshold at block (706), the torque coupling assembly 100 remains in the engaged position at block (708). The process continues to monitor the energy threshold at block (706) while the disconnect switch is in the engaged position and the vehicle is running.

A critical thermal point is a temperature value determined through testing where damage to parts of the torque coupling assembly 100 such as the clutch plates or oil can occur because of excess heat. Once the critical thermal point is determined, a thermal threshold and the approaching the thermal threshold parameters may be determined. For example, approaching the thermal threshold may be set at any value between 80 percent to 90 percent of the critical thermal point and the thermal energy threshold may be set at 90 percent of the critical thermal point to provide some thermal cushion. In this example, when the thermal energy in the clutch pack is between 80 and 90 percent of the critical thermal point, the operator would be alerted that they are thermally stressing the system and therefore should stop slipping the clutch pack of the torque coupling assembly 100. If the threshold is met or surpassed (90 percent of the critical thermal point in this example) the driveline is disconnected to prevent damage to the torque coupling assembly 100. The percentages used may change based on empirical test data related to the rate of change in thermal energy. In other words, if it only takes 200 ms to go from 80 percent of thermal capacity to a damaging value (the critical point), the operator would not have enough time to change their behavior. Hence, a lower percentage for the approaching the thermal threshold would need to be used in this example to alert the operator of approaching danger.

Some determining factors for determined thermal energy thresholds include how many BTUs/Joules are being lost to heat instead of transmitted as torque. Friction clutching is an inherently dissipative process. The dissipated power is realized as heat generation between the clutch plates within the clutch pack. Dissipated power is calculated as the torque transmitted across the clutch multiplied by the slip speed between the two halves of the clutch. Clutch torque transmission is a function of clutch clamp force, friction material radius and the coefficient of friction. The dissipated power can either be carried away by oil through convective process or be absorbed by the clutch pack. When heat is absorbed by the clutch pack, the clutch pack temperature increases, which may lead to damaging conditions or a thermal threshold of the system. To keep clutch pack temperatures in a non-damaging range, active or passive cooling is employed to carry heat away from the pack. The heat power that can be carried away by the oil is a function of the convective coefficient of the pack, the surface area of the clutch friction material and the temperature differential between the clutch pack and the oncoming oil. Convective coefficient is influenced by the specific heat of the oil, the oil flow rate and the clutch slip speed.

If it is determined at block (706) the thermal energy level is approaching the thermal threshold, an alert is provided to the operator at block (710) and the process continues at block (712) determining if the thermal energy level is above the threshold. In another embodiment block (712) determines if the thermal energy level has reached the thermal threshold.

If the thermal energy level is determined to not be above the thermal threshold at block (712), the process continues at block (714), where the current thermal energy level is calculated using sensor data from block (716). If the thermal energy is determined to be above the thermal threshold at block (712), the torque coupling assembly 100 is disengaged at block (718) and an alert is sent the operator at block (720). Further in an embodiment, the operator is allowed to re-engage the torque coupling assembly after a period of time has passed and/or once the thermal energy level is no longer approaching the thermal threshold. Once that has occurred the process continues monitoring the thermal energy at block (706) while the vehicle is running.

Figure 8:
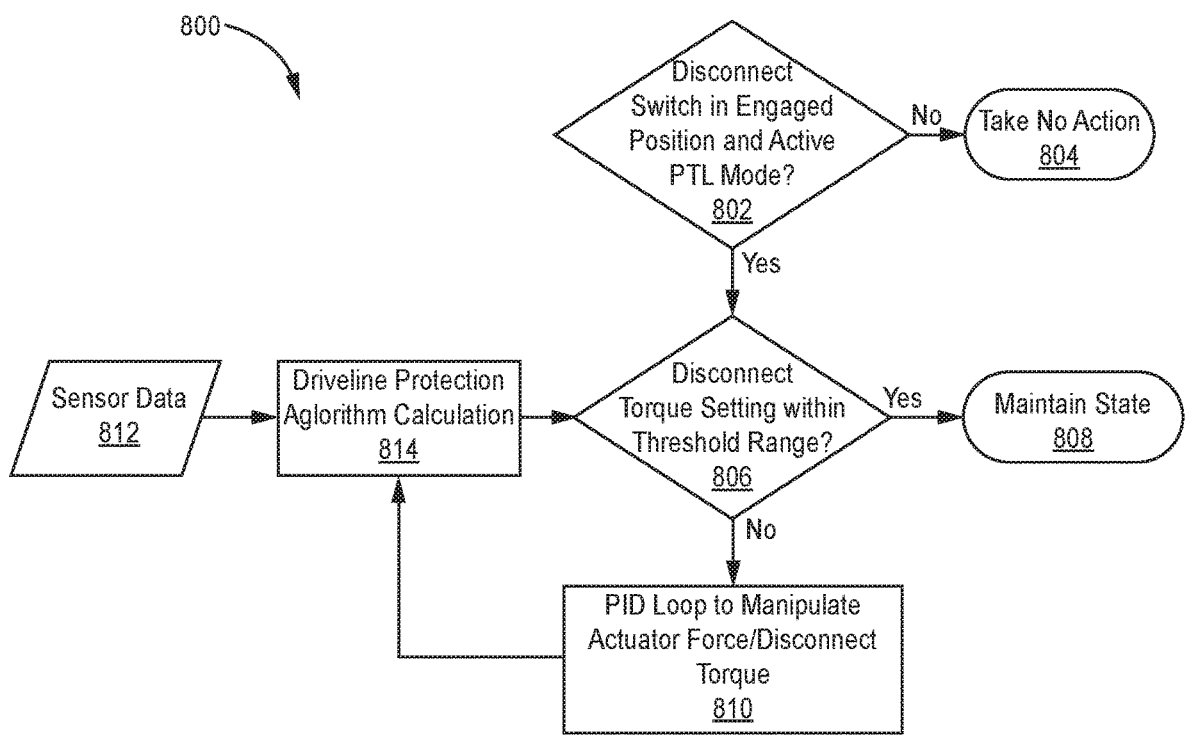
FIG. 8 illustrates a torque disconnect protection flow diagram of another exemplary embodiment.
Figure 9:
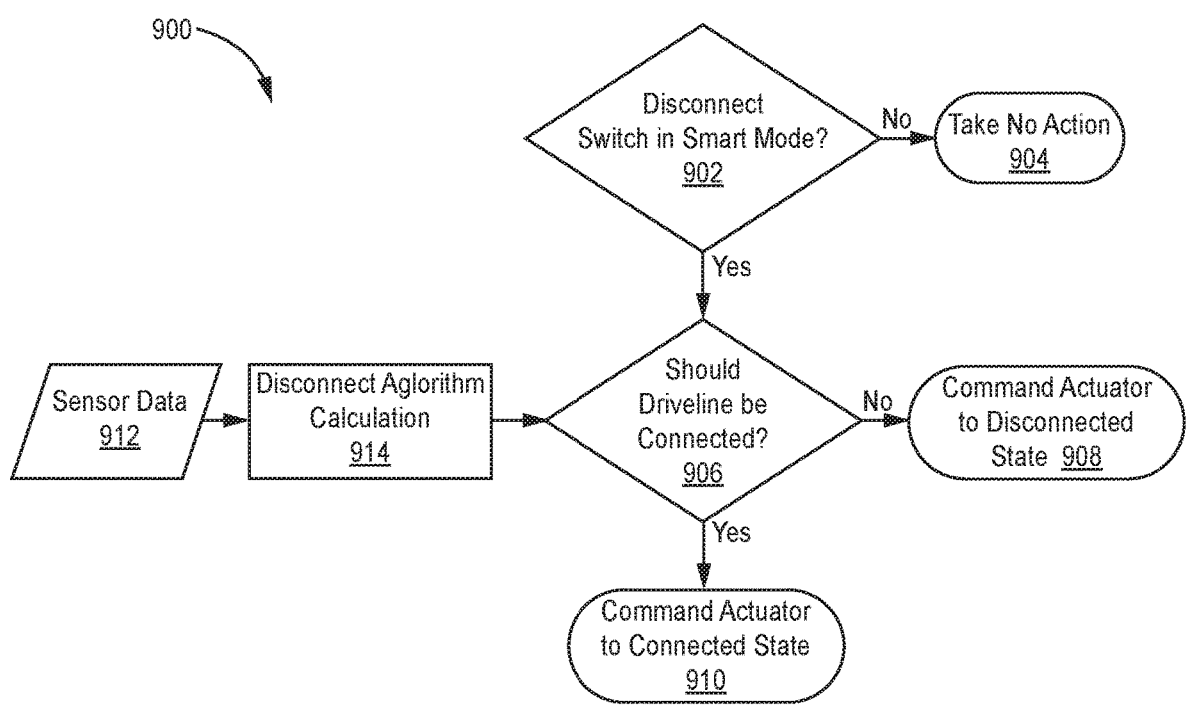
FIG. 9 illustrates a smart mode disconnect flow diagram of another exemplary embodiment.
Figure 10:
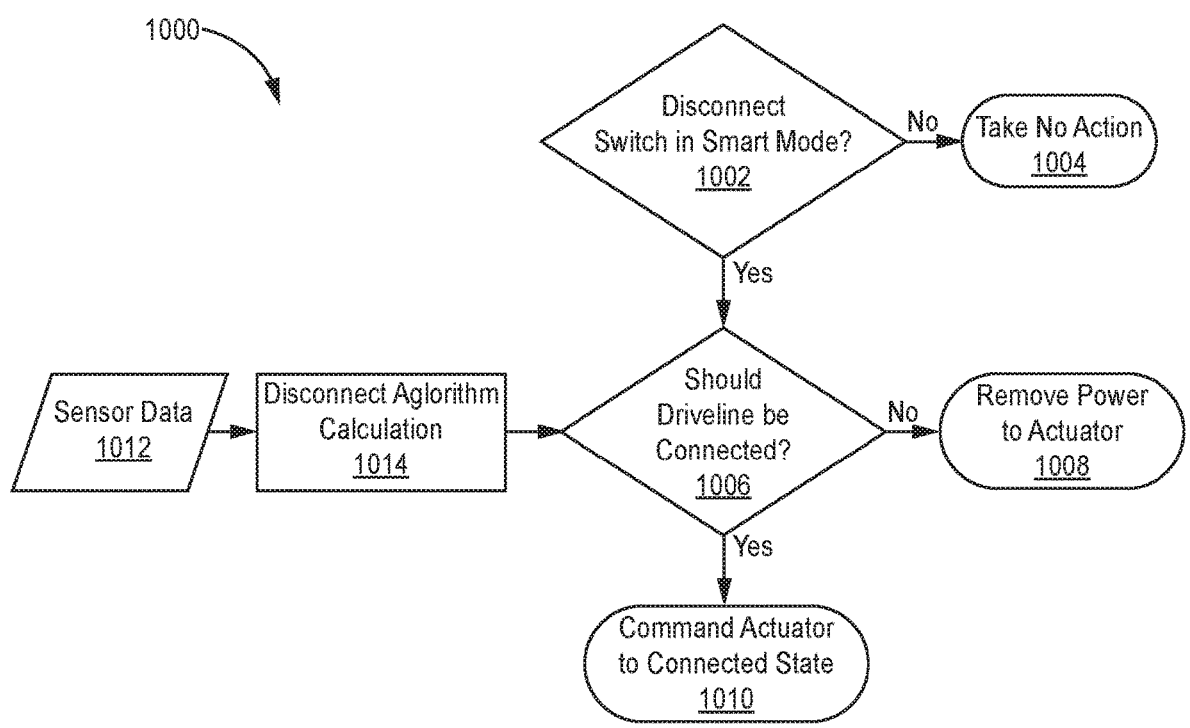
FIG. 10 illustrates smart mode disconnect flow diagram of another exemplary embodiment.

The example flow diagrams of FIGS. 8, 9 and 10 provide examples for a smart disconnect engagement. The flow diagram of FIGS. 8 and 9 assumes that the actuator 300 needs to be driven to manipulate the disconnect 100 to both a connected (engaged) and disconnect (disengaged) condition. The flow diagram 10, on the other hand, assumes the actuator is capable of being back driven to a position to either connect or disconnect the torque coupling assembly 100 at power down.

In particular, FIG. 8 illustrates an example of a torque disconnect protection flow diagram. In this example embodiment, the process starts in block (802) determining if a disconnect switch 406 is in an engaged position and in an active peak torque limiting mode while the vehicle is running. If the disconnect switch 406 is not in an engaged position and in an active peak torque limiting mode, no action is taken at block (804). If it is determined at block (802) that the disconnect switch 406 is in an engaged position and in an active peak torque limiting mode, it is determined if a disconnect torque setting is within a threshold range at block (806). An example of a threshold range is plus or minus 5 percent of a value calculated at block (814). If it is within a threshold range at block (806), the state is maintained at block (808).

If it is determined at block (806) that the current disconnect setting is not within the threshold range, a logic control implemented by the controller 402, such as but not limited to a proportional, integral and derivative (PID) loop is used to manipulate a torque/actuator force/actuator position/disconnect torque at block (810) to cause the actuator 300 to manipulate the torque coupling assembly 100. The process continues at block (814) where a driveline protection algorithm calculates the disconnect torque setting based on sensor data from block (812). The process continues monitoring the disconnect torque setting while the disconnect switch 406 is in the engaged position at block (806) and the associated vehicle is running.

FIG. 9 illustrates a smart mode disconnect flow diagram 900 of one example embodiment. In this example flow diagram 900, the process starts by detecting if a disconnect switch 406 is placed in a smart mode at block (902) while an associated vehicle is running. If it not, no action is taken at block (904). If it is determined the disconnect switch 406 is positioned in a smart mode at block (902), it is determined if the driveline should be connected at block (906). A disconnect algorithm that is calculated at block (914), based on sensor data from block (912), is used at block (906) in determining if the driveline should be connected. If it is determined at block (906) the driveline should not be connected, the actuator is commanded to place the torque coupling assembly 100 in a disconnected state at block (908). If it is determined at block (906) the driveline should be connected, the actuator 300 is commanded to place the torque coupling assembly 100 in a connected state at block (910). The process continues monitoring if the driveline should be connected at block (906) while smart mode is selected in the disconnect switch 406 and the associated vehicle is running.

FIG. 10 illustrates another smart mode disconnect flow diagram 1000 of another example embodiment. In this example flow diagram 1000, the process starts by detecting if a disconnect switch 406 is placed in a smart mode at block (1002) while an associated vehicle is running. If it not, no action is taken at block (1004). If it is determined the disconnect switch 406 is positioned in a smart mode at block (1002), it is determined if the driveline should be connected at block (1006). A disconnect algorithm that is calculated at block (1014), based on sensor data from block (1012), is used at block (1006) in determining if the driveline should be connected. If it is determined at block (1006) the driveline should not be connected, in this embodiment, power is removed from the actuator 300 at block (1008). If it is determined at block (1006) the driveline should be connected, the actuator 300 is commanded to place the torque coupling assembly 100 in a connected state at block (1010). The process continues monitoring if the driveline should be connected at block (1006) while smart mode is selected in the disconnect switch 406 and the associated vehicle is running.

Example Embodiments

Example 1 includes a smart driveline disconnect assembly having a torque coupling assembly, an actuator, at least one sensor and a controller. The torque coupling assembly is configured to selectively couple torque between a transmission and a final drive assembly. The actuator is configured to activate the torque coupling assembly. The at least one sensor is used to generate sensor information. The controller is configured to control the actuator based at least in part on the sensor information. The controller is further configured to determine at least a thermal energy level associated with the torque coupling assembly based on the sensor information and at least in part control the actuator based on the determined estimated thermal energy level.

Example 2 includes the smart driveline disconnect assembly of Example 1, wherein the controller is further configured to control at least one operating parameter of an associated engine based at least in part on the determined thermal energy level.

Example 3 includes the smart driveline disconnect assembly of any of the Examples 1-2, wherein the controller is further configured to vary the amount of coupling torque generated by the torque coupling assembly based at least in part on the sensor information.

Example 4 includes the smart driveline disconnect assembly of any of the Examples 1-3, wherein the torque coupling assembly further includes a clutch pack, a clutch outer basket, a clutch inner basket, a ball ring and a ball. The clutch pack includes a plurality of alternating first and second sets of plates. The clutch outer basket is coupled to the first set of the plurality of plates. The clutch inner basket is coupled to the second set of the plurality of plates. The ball ring includes a plurality of ball ramp channels. The ball is received in each ball ramp channel, wherein activation of the actuator causes a rotation of the ball ring to move the balls within the plurality of ball ramp channels to adjust a force on the clutch pack.

Example 5 includes the smart driveline disconnect assembly of any of the Examples 1-5, wherein the determined thermal energy level is an estimated thermal energy based on sensor information relating to at least one of actuator force sensor information, gear position sensor information, throttle position sensor information and speed delta across clutch pack sensor information.

Examples 6 includes a smart driveline disconnect assembly that includes a torque coupling assembly, an actuator, at least one sensor and a controller. The torque coupling assembly is configured to selectively couple torque between a transmission and a final drive assembly based on an external activation. The torque coupling assembly is further internally configured to adjust an amount torque coupled between the transmission and the final drive assembly to prevent damage from external forces exceeding a driveline torque capacity when the torque coupling assembly is engaged. The actuator is configured to externally activate the torque coupling assembly. The at least one sensor is used to generate sensor information. The controller is configured to control the actuator based at least in part on the sensor information.

Example 7 includes the smart driveline disconnect assembly of Example 6, wherein the controller is configured to determine at least a thermal energy level associated with the torque coupling assembly based on the sensor information and at least in part control the actuator based on the determined estimated thermal energy level.

Example 8 includes the smart driveline disconnect assembly of Example 7, wherein the determined thermal energy level is an estimated thermal energy based on sensor information relating to at least one of actuator force sensor information, gear position sensor information, throttle position sensor information and speed delta across clutch pack sensor information.

Example 9 includes a vehicle with a smart driveline disconnect assembly. The vehicle includes a motor to generate engine torque, a transmission operationally coupled to the motor, at least one drive wheel and at least one assist wheel. The at least one drive wheel is operationally coupled to the transmission. The at least one assist wheel is operationally coupled to a final drive assembly. The final drive assembly is operationally coupled to the transmission. The torque coupling assembly is operationally coupled between the final drive assembly and the transmission. The controller is configured to control the actuator based at least in part on sensor information. The controller is further configured to determine at least an estimated thermal energy level associated with the torque coupling assembly based on the sensor information and at least in part control the actuator based on the determined estimated thermal energy.

Example 10 includes the vehicle of claim 9, wherein the controller is further configured to at least one of control at least one operating parameter of an associated engine based at least in part on the determined estimated thermal energy level and to vary the amount of coupling torque generated by the torque coupling assembly based at least in part on the sensor information.

Example 11 includes the vehicle of any of the Examples 9-10, wherein the torque coupling assembly further includes a clutch pack, a clutch outer basket, a clutch inner basket, a ball ring and a ball. The clutch pack includes a plurality of alternating first and second sets of plates. The clutch outer basket is coupled to the first set of the plurality of plates. The clutch inner basket is coupled to the second set of the plurality of plates. The ball ring includes a plurality of ball ramp channels. The ball is received in each ball ramp channel, wherein activation of the actuator causes a rotation of the ball ring to move the balls within the plurality of ball ramp channels to adjust a force on the clutch pack.

Example 12 includes a method of operating a torque coupling assembly of a vehicle. The method includes generating sensor information from at least one sensor; estimating a current thermal energy level of the torque coupling assembly based at least in part on the generated sensor information; and controlling at least one of torque transfer of the torque coupling assembly and an operational parameter of an engine based on the estimated thermal energy level.

Example 13 includes the method of Example 12, further including comparing the estimated then current thermal energy level with a threshold, Example 14 includes the method of any of the Examples 11-13, further including, if the current thermal energy is above the threshold, controlling the operational parameter of the engine by reducing engine torque output by a predetermined percentage.

Example 15 includes the method of any of the Examples 11-14, further including alerting an operator when at least one of controlling the torque transfer of the torque coupling assembly and changing the operational parameter of the engine.

Example 16 includes the method of any of the Examples 11-15, further including tracking the amount of time the thermal energy level is above the threshold; and disconnecting the torque coupling assembly after a select amount of time is tracked where the thermal energy level is above the threshold.

Example 17 includes the method of any of the Examples 11-16, further including determining if the thermal energy level is approaching a threshold; and generating an alert if the thermal energy level is approaching the threshold.

Example 18 includes the method of any of the Examples 11-17, wherein the estimated thermal energy level is determined based on sensor information relating to at least one of actuator force sensor information, gear position sensor information, throttle position sensor information and speed delta across clutch pack sensor information.

Example 19 includes the method of any Examples 11-18, further including determining if a disconnect switch is in an engaged position; when the disconnect switch is in the engaged position, determining if a current torque in a driveline is within a select torque threshold range; and when the current torque in the drivetrain is within the select torque threshold range, implement a PID loop to manipulate the torque coupling assembly to at least one of adjust torque transfer and disconnect torque.

Example 20 includes the method of any of the Examples 11-19, further including determining if a disconnect switch is in a smart mode configuration; determining if a driveline should be operationally connected to the engine based at least in part on the estimated thermal energy level and a determined torque in a driveline; and when it is determined that the driveline should not be operationally connected to the engine, manipulating the torque coupling assembly to a disconnect state.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A smart driveline disconnect assembly comprising:
   a torque coupling assembly configured to selectively couple torque between a transmission and a final drive assembly;
   an actuator configured to activate the torque coupling assembly;
   at least one sensor to generate sensor information;
   a disconnect switch; and
   a controller configured to control the actuator based at least in part on the sensor information and a position of the disconnect switch, the controller further configured to determine at least an estimated thermal energy level associated with the torque coupling assembly based on the sensor information and at least in part control the actuator based on the determined estimated thermal energy level when the disconnect switch is in one of a smart mode position and an engaged position.

2. The smart driveline disconnect assembly of claim 1, wherein the controller is further configured to control at least one operating parameter of an associated engine based at least in part on the determined estimated thermal energy level.

3. The smart driveline disconnect assembly of claim 1, wherein the controller is further configured to vary the amount of coupling torque generated by the torque coupling assembly based at least in part on the sensor information.

4. The smart driveline disconnect assembly of claim 1, wherein the torque coupling assembly further comprises:
   a clutch pack including a plurality of alternating first and second sets of plates
   a clutch outer basket coupled to the first set of the plurality of plates;
   a clutch inner basket coupled to the second set of the plurality of plates;
   a ball ring including a plurality of ball ramp channels; and
   a ball received in each ball ramp channel, wherein activation of the actuator causes a rotation of the ball ring to move the balls within the plurality of ball ramp channels to adjust a force on the clutch pack.

5. The smart driveline disconnect assembly of claim 1, wherein the determined estimated thermal energy level is based on sensor information relating to at least one of actuator force sensor information, gear position sensor information, throttle position sensor information and speed delta across clutch pack sensor information.

6. A smart driveline disconnect assembly comprising:
   a torque coupling assembly configured to selectively couple torque between a transmission and a final drive assembly, the torque coupling assembly further internally configured to adjust an amount of torque coupled between the transmission and the final drive assembly to prevent damage from external forces exceeding a driveline torque capacity when the torque coupling assembly is engaged;
   an actuator configured to externally activate the torque coupling assembly;
   at least one sensor to generate sensor information;
   a disconnect switch; and
   a controller configured to control the actuator based at least in part on the sensor information and the disconnect switch, when the disconnect switch is in one of an engaged position and a smart mode position and the smart driveline disconnect assembly is in an active peak torque limiting mode, the controller is configured to determine a current torque from the sensor information and determine if the current torque is within a threshold range, when the current torque is not within the threshold range implementing a proportional integral and derivative (PID) loop to control the actuator to manipulate the torque coupling assembly.

7. The smart driveline disconnect assembly of claim 6, wherein the controller is configured to determine at least a thermal energy level associated with the torque coupling assembly based on the sensor information and at least in part control the actuator based on the determined thermal energy level.

8. The smart driveline disconnect assembly of claim 7, wherein the determined thermal energy level is an estimated thermal energy based on sensor information relating to at least one of actuator force sensor information, gear position sensor information, throttle position sensor information and speed delta across clutch pack sensor information.

9. A vehicle with a smart driveline disconnect assembly, the vehicle comprising:
   a motor to generate engine torque;
   a transmission operationally coupled to the motor;
   at least one drive wheel operationally coupled to the transmission;
   at least one assist wheel operationally coupled to a final drive assembly, the final drive assembly operationally coupled to the transmission;
   a torque coupling assembly operationally coupled between the final drive assembly and the transmission;
   an actuator configured to activate the torque coupling assembly;
   a disconnect switch; and
   a controller configured to control the actuator based at least in part on sensor information and a position of the disconnect switch, the controller further configured to determine at least an estimated thermal energy level associated with the torque coupling assembly based on the sensor information and at least in part control the actuator based on the determined estimated thermal energy when the disconnect switch is in one of a smart mode position and an engaged position.

10. The vehicle of claim 9, wherein the controller is further configured to control at least one operating parameter of an associated engine based at least in part on the determined estimated thermal energy level and to vary the amount of coupling torque generated by the torque coupling assembly based at least in part on the sensor information.

11. The vehicle of claim 9, wherein the torque coupling assembly further comprises:
   a clutch pack including a plurality of alternating first and second sets of plates
   a clutch outer basket coupled to the first set of the plurality of plates;
   a clutch inner basket coupled to the second set of the plurality of plates;
   a ball ring including a plurality of ball ramp channels; and
   a ball received in each ball ramp channel, wherein activation of the actuator causes a rotation of the ball ring to move the balls within the plurality of ball ramp channels to adjust a force on the clutch pack.

12. A method of operating a torque coupling assembly of a vehicle, the method comprising:
   generating sensor information from at least one sensor;
   estimating a current thermal energy level of the torque coupling assembly based at least in part on the generated sensor information;
   controlling at least one of torque transfer of the torque coupling assembly and an operational parameter of an engine based on the estimated thermal energy level;

determining if a disconnect switch is in a smart mode configuration;

determining if a driveline should be operationally connected to the engine based at least in part on the estimated thermal energy level and a determined torque in a driveline; and when it is determined that the driveline should not be operationally connected to the engine, manipulating the torque coupling assembly to a disconnect state.

13. The method of claim 12, further comprising:
comparing the estimated then current thermal energy level with a threshold.

14. The method of claim 12, further comprising:
if the current thermal energy is above the threshold, controlling the operational parameter of the engine by reducing engine torque output by a predetermined percentage.

15. The method of claim 12, further comprising:
alerting an operator when at least one of controlling the torque transfer of the torque coupling assembly and changing the operational parameter of the engine.

16. The method of claim 12, further comprising:
tracking the amount of time the estimated thermal energy level is above the threshold; and disconnecting the torque coupling assembly after a select amount of time is tracked where the thermal energy level is above the threshold.

17. The method of claim 12, further comprising:
determining if the thermal energy level is approaching a threshold; and generating an alert if the thermal energy level is approaching the threshold.

18. The method of claim 12, wherein the estimated thermal energy level is determined based on sensor information relating to at least one of actuator force sensor information, gear position sensor information, throttle position sensor information and speed delta across clutch pack sensor information.

19. A method of operating a torque coupling assembly of a vehicle, the method comprising:

determining if a disconnect switch is in one of an engaged position and a smart mode position;

when the disconnect switch is in one of the engaged position and the smart mode position, determining if a current torque in a driveline is within a select torque threshold range;

when the current torque in the drivetrain is not within the select torque threshold range, implement a proportional integral and derivative (PID) loop to manipulate the torque coupling assembly to at least one of adjust torque transfer and disconnect torque, generating sensor information from at least one sensor;

estimating a current thermal energy level of the torque coupling assembly based at least in part on the generated sensor information; and controlling at least one of torque transfer of the torque coupling assembly and an operational parameter of an engine based on the estimated thermal energy level.

20. The method of claim 19, wherein when the disconnect switch is in the smart mode position, implementing a disconnect algorithm to determine if the driveline should be connected.

* * * * *